United States Patent [19]
Kepler

[11] 3,974,648
[45] Aug. 17, 1976

[54] VARIABLE GEOMETRY RAMJET ENGINE

[75] Inventor: Charles Edward Kepler, East Hartford, Conn.

[73] Assignee: United Technologies Corporation, Hartford, Conn.

[22] Filed: Aug. 19, 1968

[21] Appl. No.: 753,789

[52] U.S. Cl. .............................. 60/204; 60/270 R; 137/15.2
[51] Int. Cl.² .......................................... F02K 7/08
[58] Field of Search ............. 60/270; 137/15.2, 15.1

[56] References Cited
UNITED STATES PATENTS

| | | | |
|---|---|---|---|
| 2,540,594 | 2/1951 | Price | 60/240 |
| 2,684,570 | 7/1954 | Nordfors | 60/245 |
| 3,363,421 | 1/1968 | Ferri | 60/263 |

*Primary Examiner*—Samuel Feinberg
*Attorney, Agent, or Firm*—Charles A. Warren

[57] ABSTRACT

A variable-geometry ramjet engine, capable of operation over the Mach 3 to 12 speed range, is provided by disposing a movable cowl around a centerbody. The engine is axisymmetric and features a translatable cowl which slides relative to the centerbody on circumferentially spaced radially extending support struts. Forward translation of the cowl provides a variable inlet area resulting in higher compression at the high Mach numbers than is possible with a fixed-geometry configuration. Rearward cowl translation increases the combustor length and combustor area ratio at the low flight Mach numbers to improve low-speed combustion characteristics. Cowl translation changes the nozzle area ratio to provide a large expansion ratio at high flight speeds and a low expansion ratio at the low flight speeds.

3 Claims, 7 Drawing Figures

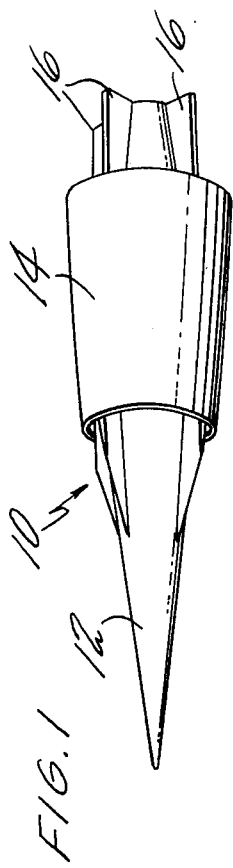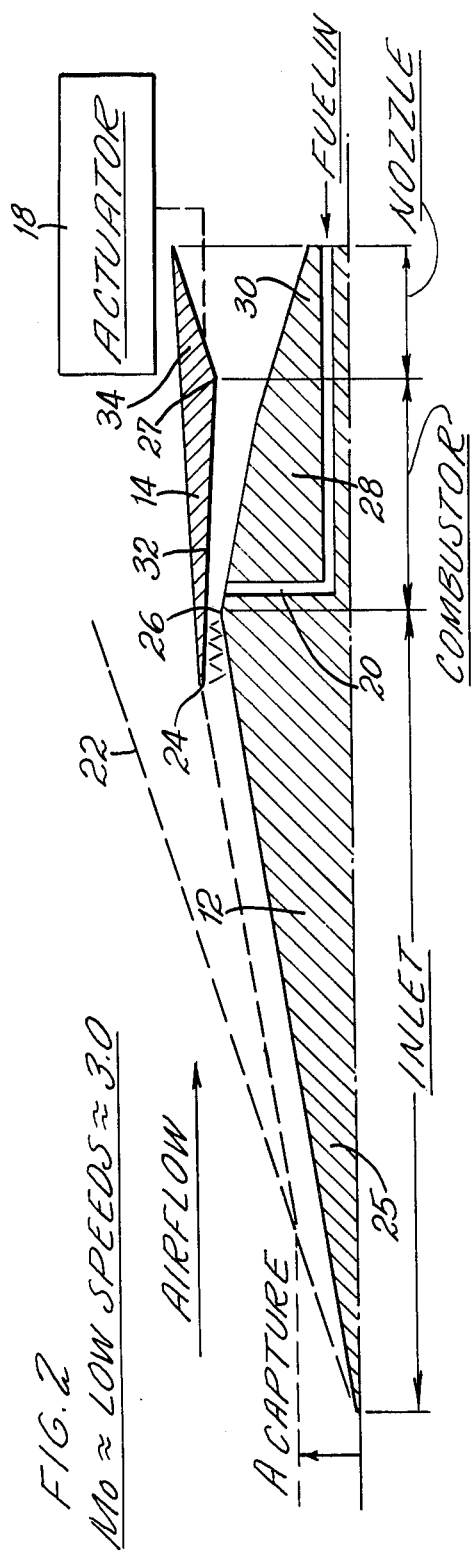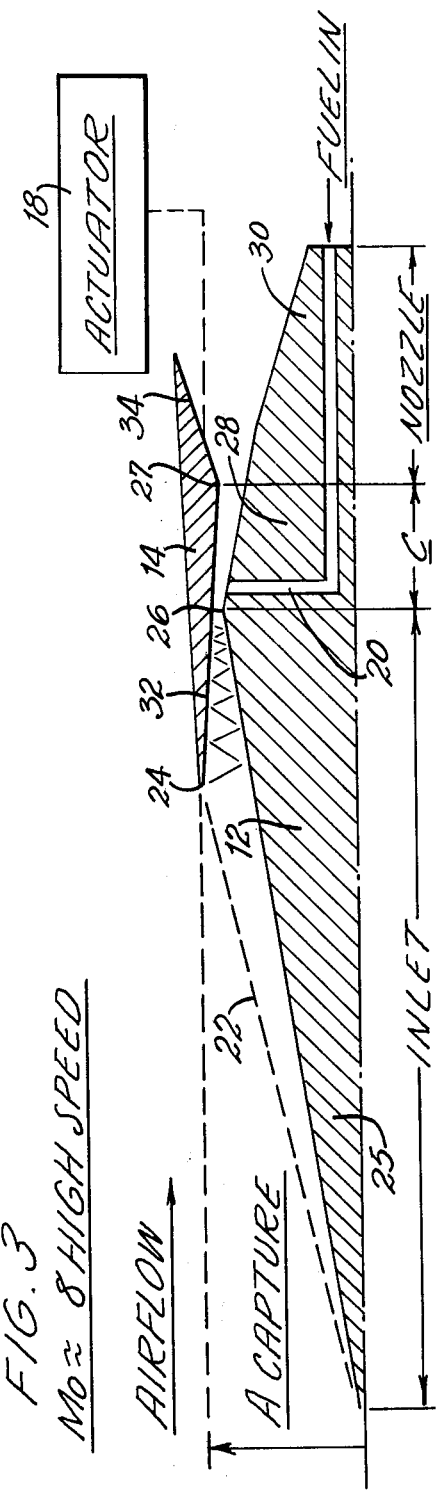

3,974,648

VARIABLE GEOMETRY RAMJET ENGINE

BACKGROUND OF THE INVENTION

This invention relates to ramjet engines operable over a range of supersonic speeds. More specifically, this invention relates to variable-geometry ramjet engines capable of oepration in the Mach 3 to 12 speed range. This variable-geometry ramjet engine configuration matches the conflicting requirements of a supersonic inlet, a combustor, and a nozzle to provide a sophisticated supersonic ramjet engine which is efficient, minimizes performance compromises, and is structurally, uncomplicated.

It is well known in the prior art to provide axisymmetric external-plus-internal compression inlets for use on supersonic engines. Such inlets compress the flow by a series of oblique shocks to provide a high inlet total pressure recovery. Automatic scheduling of the inlet cowl position to accommodate various flight speeds is well within the state of the art.

The selection of a burner geometry is a compromise of the various area ratio schedules which can be achieved within the geometrical limitations of a practical engine scheme. At low Mach numbers, the combustor entrance area or inlet throat area and the burner area ratio are increased. The nozzle, having an increasing area ratio with increasing Mach number, is required to provide the proper expansion of the hot engine exhaust stream.

I have found that I can incorporate these requirements into a simple ramjet engine by a single movable element, namely the translatable cowl. With my invention, the engine geometry has not been compromised to the extent that the attractive high-speed performance is seriously degraded. I have found that a ramjet engine can be provided to operate over a wide Mach number range without severely compromising the conflicting requirements of the inlet, burner, and nozzle at the various flight speeds. Further, this engine is capable of varying the basic engine design parameters with a single moving component, thus providing a practical engine construction.

SUMMARY OF THE INVENTION

The object of this invention is to provide a variable geometry ramjet engine which is capable of operation in the Mach 3 to 12 speed range.

Another object of the invention is the extension of the operating range of a ramjet engine to lower supersonic speeds without significantly penalizing the high speed performance through the use of a single moving component; namely, a translatable cowl to provide a variable inlet, combustor, and nozzle.

A further object of the invention is the provision of a translatable cowl which moves forward relative to the centerbody with increasing Mach number thereby increasing the airflow captured, decreasing the throat area, increasing aerodynamic compression of the air, decreasing burner area ratio, and increasing the nozzle area ratio.

A still further object of this invention is the provision of a variable-geometry ramjet engine which does not require radially movable walls to adapt to varying engine requirements.

Still another object of this invention is the provision of a ramjet engine with a limited number of circumferentially spaced cowl support struts thereby minimizing the interaction effects caused by struts.

Other objects, features and advantages of the present invention will become more apparent from the following detailed description of the preferred embodiment thereof and from the accompanying drawings.

BRIEF DESCRIPTION OF THE DRAWINGS

FIG. 1 is a perspective view of a ramjet engine showing the translatable cowl supported on circumferentially spaced struts around a centerbody.

FIG. 2 is a schematic illustration of the cowl and centerbody positions at lower supersonic Mach numbers.

FIG. 3 is a schematic illustration of the cowl position at higher supersonic Mach numbers.

DESCRIPTION OF THE PREFERRED EMBODIMENT

Figure 4:
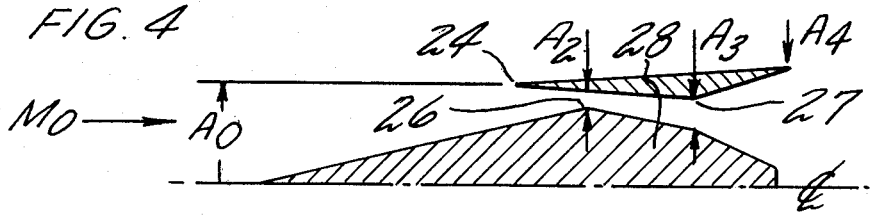
FIG. 4 is a schematic illustration of the engine showing the various station designations and areas.

The variable geometry ramjet engine 10 shown in FIG. 1 includes a centerbody 12 and a cowl 14 surrounding the centerbody. The cowl 14 is supported on the centerbody by radially extending longitudinal struts 16. This engine is an effective system for powering atmospheric flight in the Mach 3 to 12 speed range. It is highly desirable to extend the operating range of ramjets to flight speeds as low as Mach 3 to provide sufficient thrust at the lower supersonic flight speeds to self-accelerate to the hypersonic speeds.

As seen in FIGS. 2 and 3, the cowl 14 can be translated forward and aft on the centerbody 12 by sliding the cowl on the struts 16 (not shown). In FIG. 2, the cowl 14 is in the aft position representing the cowl position at the low supersonic speed condition. These flight speeds correspond to Mach numbers about Mach 3 which is the lower self-sustaining Mach number range. Actuators 18 located in the radial struts 16 engage the cowl 14 and provide the force to translate the cowl relative to the centerbody 12. The oblique shock 22 formed at the leading edge of the centerbody does not intercept the leading edge of lip 24 on the cowl 14 at low flight speeds. For this flight condition, the excessive airflow is spilled efficiently by the centerbody shock. At the design Mach number as shown in FIG. 3, the oblique shock associated with high speed flight intercepts the leading edge 24 of the cowl 14. The inlet, combustor, and nozzle sections of the engine are designated in FIGS. 2 and 3.

Referring briefly to FIG. 4, $A_0$ represents the projected cowl lip area and is not necessarily the airflow capture area as can be seen in FIG. 2. $M_0$ represents free stream Mach number. $A_2$ represents the inlet throat or combustor entrance area and $A_3$ signifies the combustor exit or nozzle entrance area. $A_4$ is the nozzle exit area of the engine. The greatest diameter of the centerbody occurs at point 26. As the cowl moves forward, the throat position remains at point 26 causing the throat area to decrease. Similarly, as the cowl moves forward, the combustor exit position, point 27, moves forward and combustor exit area decreases. The preferred ratio of cowl length to centerbody length is in the range from 0.30 to 0.60.

Figure 5:
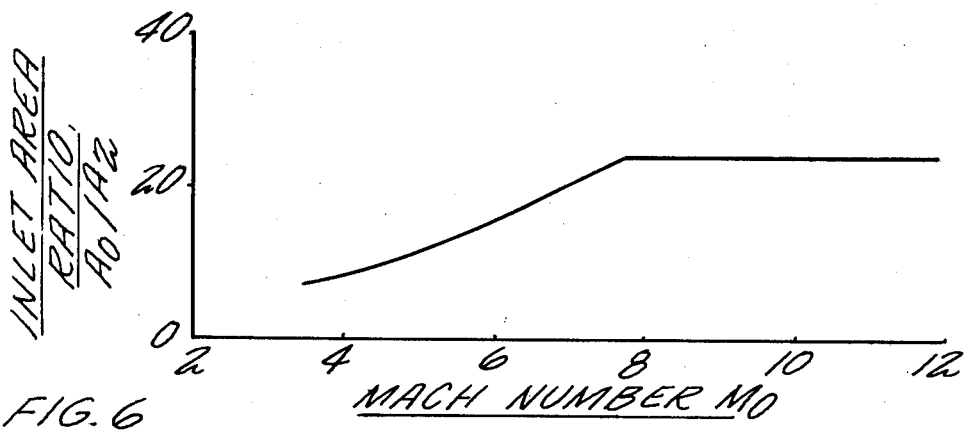
FIG. 5 is a graphic representation of the inlet area ratio variation depending on cowl position.
Figure 6:
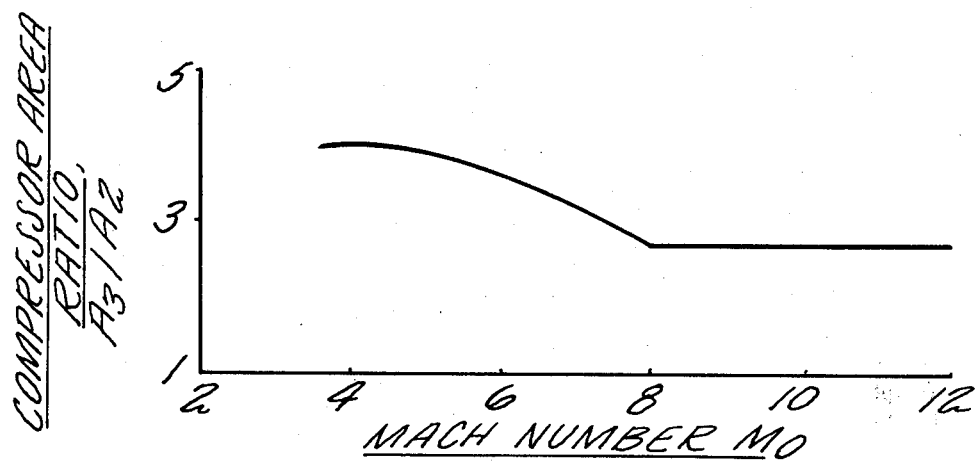
FIG. 6 is a graphic representation of the combustor area ratio variation depending on cowl position.
Figure 7:
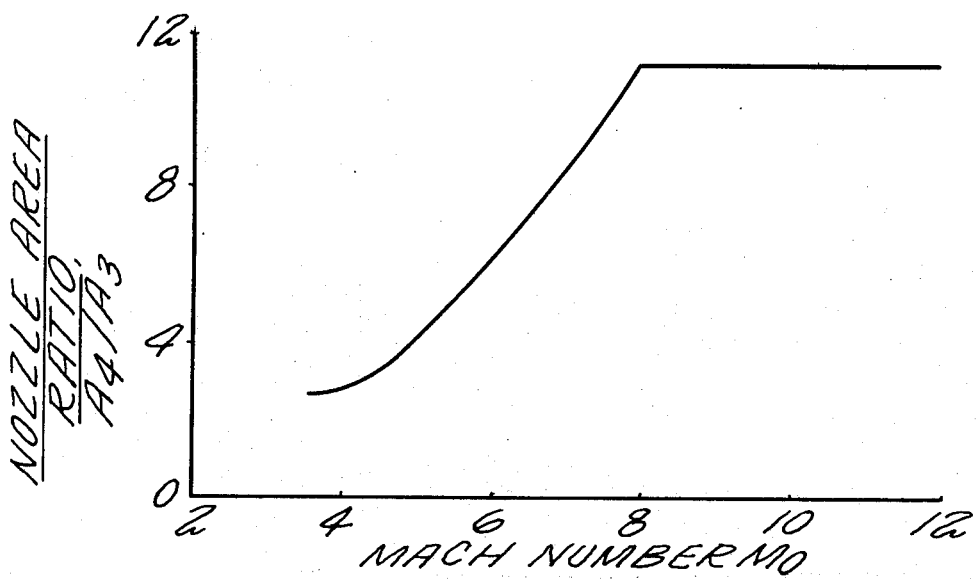
FIG. 7 is a graphic representation of the nozzle area ratio variation depending on cowl position.

FIGS. 5, 6, and 7 graphically represent the effects of cowl translation on the critical area ratios of the engine. The supersonic inlet is designed to operate over the Mach 3 to 12 range and is capable of providing efficient performance over this range. The inlet provides high compression ratios over the entire speed range by providing a variable throat area which is small during high Mach number operation and large during low Mach number operation as illustrated in FIG. 5. The inlet area ratio should be low at the low Mach numbers and high at the high Mach numbers to maintain the high operating compression ratio over the entire speed range. Generally, the inlet is started by fully extending the centerbody or retracting the cowl to establish supersonic flow.

The operation of a ramjet engine over the Mach 3 to 12 flight range requires efficient combustion over an equally wide range of operating conditions. The design of an efficient combustor requires a compromise between many conflicting factors. For example, a large area divergence is required to prevent thermal coking when high heat release rates are needed at the low inlet Mach numbers. Conversely, a low area divergence is desirable at high Mach numbers to minimize total pressure losses. Long burner lengths are desirable to enable complete mixing and complete reaction of fuel. A short burner is desirable to reduce skin friction losses and cooling requirements. At low flight Mach numbers, piloting or flame holding devices may be required to ensure stable combustion or to reduce the length required for complete combustion. Fuel is injected into the combustor through conduits 20. It is apparent that the cowl translation provides a desirable high burner area ratio at the low Mach numbers and a lower burner area ratio at the higher Mach numbers. Although the combustor length increases as the Mach number is reduced, the nondimensional length/passage height is relatively constant.

Optimum matching of the engine components is accomplished by the conception of a unique flow passage arrangement between the cowl and the centerbody. Centerbody 10 has a conical inlet spike 25. The inlet spike 25 is mated to a mid-section 28 which is substantially a truncated conically shaped body. An aft-section 30 is integral with the mid-section 28 and is substantially a truncated conically shaped body having a steeper taper than the mid-section 28. The forward portion of the inner surface of the cowl has a first wall 32, a portion of which forms an annular diverging flow passage with the centerbody mid-section 28. The first inner wall preferably tapers inwardly. The inner cowl surface has a trailing wall 34 which flares outward to form a divergent plug nozzle with the centerbody aft-section 30. As the cowl translates, there is overlap of the surfaces defining the engine components. It should be noted that point 26 always defines the combustor entrance and point 27 always defines the combustor exit. Further, it should be apparent to blend the various surfaces to provide a smooth flow surface as long as the diverging combustor and nozzle passages are provided. Thus, reference to FIGS. 2 and 3 will show that a diverging combustor passage is defined by the cowl and centerbody and is followed by a diverging nozzle passage of greater divergence than the combustor passage. Cowl translation changes the combustor length, the combustor area ratio and simultaneously changes the nozzle expansion ratio with a single motion.

The nozzle configuration is annular with essentially a truncated centerbody as best seen in FIGS. 2 and 3. At Mach 8, the cowl position is illustrated as being fixed and only the flow conditions at the nozzle entrance change for flight Mach numbers between 8 and 12. The optimum nozzle has a large expansion ratio at the high Mach numbers and a low expansion ratio at the low Mach numbers. Consequently, the nozzle geometry has been selected to minimize the over expansion and under expansion loses.

Simplicity of ramjet design is afforded with this invention. This engine is mechanically simple and less involved than other variable-geometry ramjet engines and is capable of excellent performance over a wide variety of flight conditions. It is evident that this invention is described as having a cowl which translates on the centerbody. The motion of the cowl relative to the centerbody is the important feature and an obvious modification is to fix the cowl to an aircraft and to translate the centerbody. Similarly, it is apparent that this engine could be unfolded to provide a two-dimensional ramjet engine. While the sliding cowl is shown in two positions, the cowl position would in general be modulated over part or all of the flight range.

Although a preferred embodiment of this invention has been illustrated and described, it should be understood by those skilled in the art that various changes and omissions in the form and detail may be made herein without departing from the spirit and the scope of the invention which is to be limited and defined only as set forth in the following claims.

I claim:

1. A variable-geometry ramjet engine comprising:
   a centerbody having a divergent inlet section, a convergent mid-section and a convergent aft-section;
   a cowl surrounding and spaced from the centerbody, the cowl inner surface having a convergent first wall and an outwardly flaring divergent trailing wall, wherein a portion of the convergent first wall opposes at least a portion of the divergent inlet section of the centerbody to define a convergent passage in which compression occurs, said convergent wall also opposing at least a part of the mid-section of the centerbody to define divergent passage in which combustion occurs, and said divergent trailing wall opposing a part of the convergent aft-section to define a divergent nozzle,
   a plurality of support struts for maintaining the spaced position of the cowl with respect to the centerbody; and
   means for translating one with respect to the other so that the cowl position is forward relative to the centerbody with increasing Mach number.

2. A ramjet engine as in claim 1 wherein the cowl length is between 30–60 percent of the centerbody length.

3. In a ramjet engine including a centerbody, a cowl and a plurality of supports connecting the cowl and the centerbody, the method of providing a variable geometry flow path with a single basic movable component comprising the steps of:
   providing the centerbody with a divergent inlet section, a substantially truncated conical convergent mid-section and a substantially truncated conical convergent aft-section having a steeper taper than the mid-section;

providing the cowl inner surface with a first annular convergent wall and an outwardly flaring divergent annular wall downstream of the first wall;

positioning the cowl around the centerbody on the supports so that a portion of first annular cowl wall opposes a portion of the divergent section of the centerbody to define an annular compressor section, and so that the remainder of the first annular wall of the cowl opposes a part of the convergent mid-section of the centerbody to define an annular diverging combustor passage and with the divergent annular wall of the cowl forming with the centerbody an annular diverging nozzle passage of greater divergence; and translating one with respect to the other so that the cowl is essentially moved forward with respect to the centerbody with increasing Mach number thereby increasing the airflow capture area, decreasing the inlet throat area, decreasing the combustor exit area and increasing the nozzle area ration.

* * * * *